L. BRADLEY.
METHOD OF CONTROLLING ELETRIC MOTORS BY MEANS OF ELECTRIC CURRENT CONTROLLING DEVICES.
APPLICATION FILED MAR. 14, 1918.

1,361,224. Patented Dec. 7, 1920.
6 SHEETS—SHEET 1.

Witnesses
Fred Palm

Inventor
Lynde Bradley
By Louis Quarles
Attorney

L. BRADLEY.
METHOD OF CONTROLLING ELETRIC MOTORS BY MEANS OF ELECTRIC CURRENT CONTROLLING DEVICES.
APPLICATION FILED MAR. 14, 1918.

1,361,224.

Patented Dec. 7, 1920.

Witnesses
Fred Palm

Inventor
Lynde Bradley

By Louis Quarle
Attorney

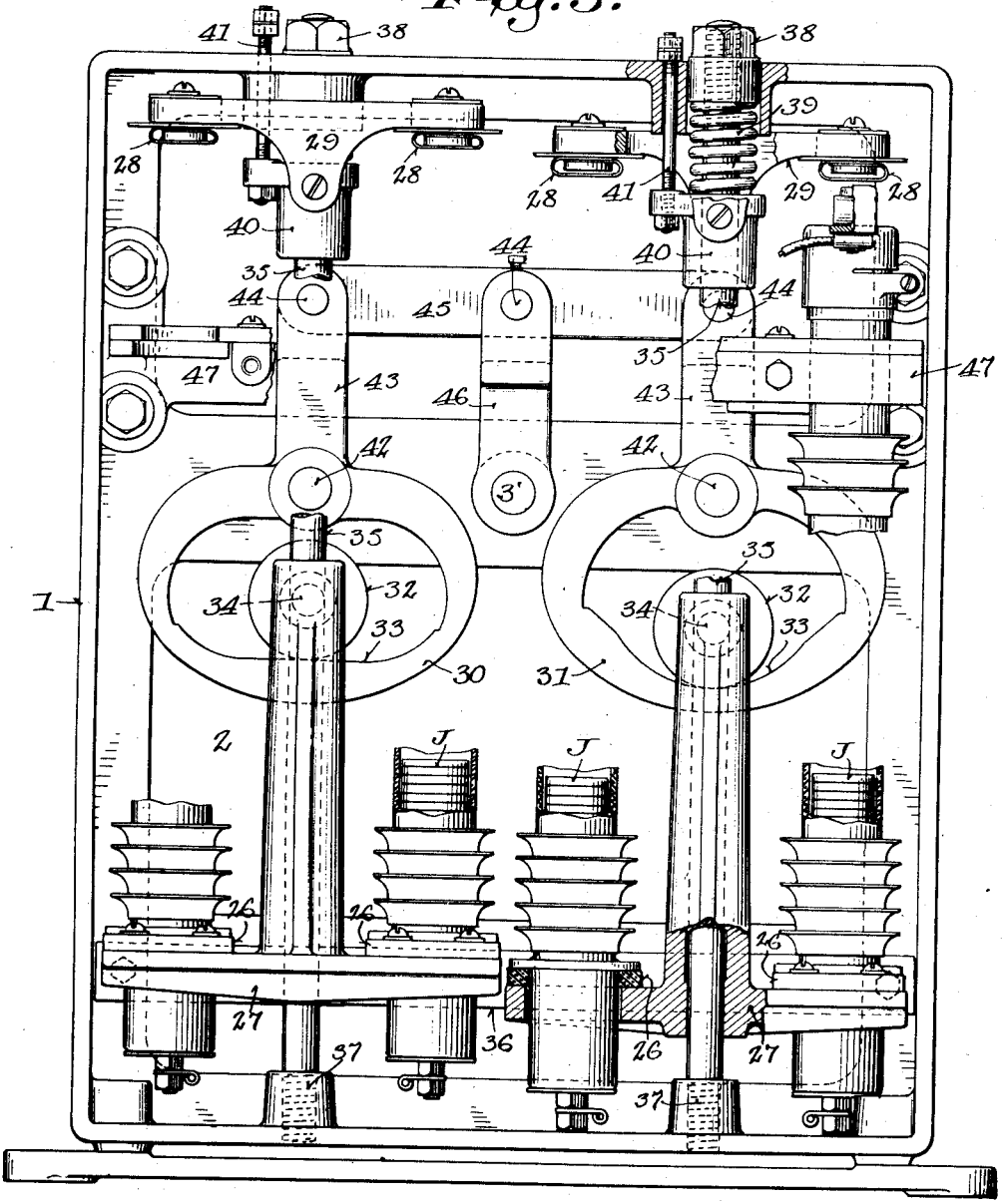

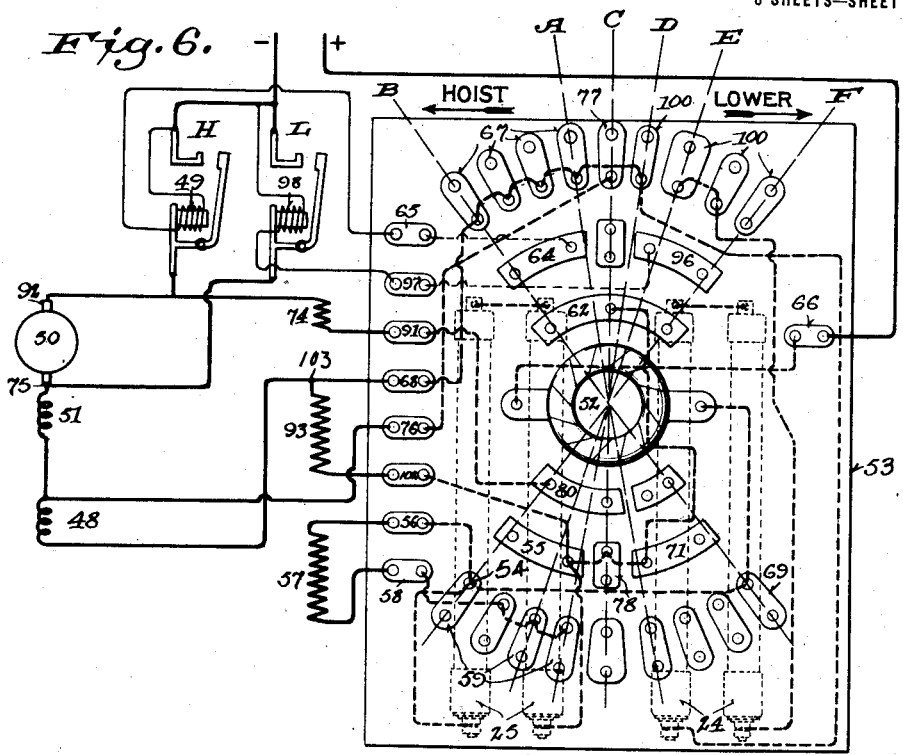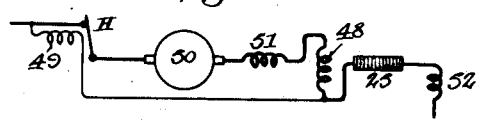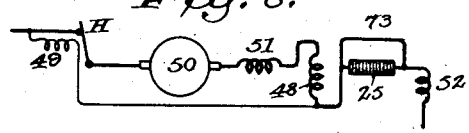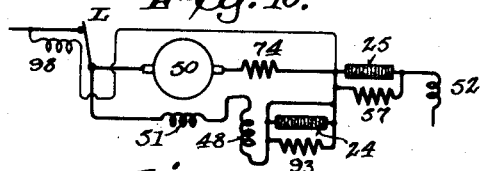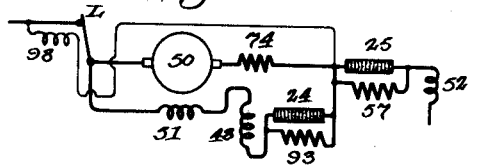

UNITED STATES PATENT OFFICE.

LYNDE BRADLEY, OF MILWAUKEE, WISCONSIN.

METHOD OF CONTROLLING ELECTRIC MOTORS BY MEANS OF ELECTRIC-CURRENT-CONTROLLING DEVICES.

1,361,224.  Specification of Letters Patent.  Patented Dec. 7, 1920.

Application filed March 14, 1918. Serial No. 222,296.

*To all whom it may concern:*

Be it known that I, LYNDE BRADLEY, a citizen of the United States, residing at Milwaukee, county of Milwaukee, and State of Wisconsin, have invented certain new and useful Improvements in Methods of Controlling Electric Motors by Means of Electric-Current-Controlling Devices, of which the following is a specification, reference being had to the accompanying drawings, forming a part thereof.

My invention relates to methods of controlling electric motors by means of improvements in electric current controlling devices of the compression resistance type. The general object of such devices is to progressively vary the value of the protecting resistances in the circuits of a motor and thereby control the direction of rotation and speed.

My invention, herein disclosed, relates more specifically to a method of and means for controlling electric motors, and particularly series wound motors used for electric hoists or any purpose where the load in one direction at times tends to drive the motor. For clarity I will describe my invention in connection with an electric hoist to which it is particularly applicable.

For hoisting loads against gravity, the series wound motor is generally adopted, due to its very desirable characteristic of varying its speed inversely as the load; that is, the speed increases as the load decreases, and automatically decreases as the load increases, thereby avoiding excessive demands for power while handling the various loads efficiently and rapidly.

For lowering loads, a device known as the "mechanical brake" has been generally used to absorb by friction all of the energy of the falling load, over and above that absorbed in overcoming the friction of the hoist mechanism. This "mechanical brake" is in addition also called upon to produce sufficient friction load upon the motor, so that speed variations can be effected through the varying of the current flow through resistance changes in the controller and also to dampen the inertia of the armature.

This control of the lowering speed of the motor and the absorption of the energy of the falling load by means of a friction device in the form of a mechanical brake is undesirable as there is a constant heating and attrition of the friction surfaces, making frequent adjustments, repairs and skilled attention necessary for the successful operation of the hoist.

I am aware that dynamic braking has been used before but always in a step by step system of control. This system has its grave limitations, there is constant arcing from one step to another and it lacks the flexibility of control that is obtainable by means of my invention which offers a complete continuum from minimum to maximum speeds on both raising and lowering. I am thus enabled to avoid the disadvantages incident to arcing, which means constant burning and wearing of the contacts, with frequent repairs, and I avoid throwing sudden changes of load upon the motor with the consequent stresses on the hoisting mechanism, cables and load, and overloading and burning of the motor commutator. As a result I get a system of control that is flexible and smooth and a controller that is freed from the aforesaid undesirable characteristics.

The principal objects of my invention are:

First, to provide a method of and a means for controlling a series wound motor usable in connection with an electric hoist, of such nature as to retain the desirable characteristics of the series motor for hoisting purposes and obviate its undesirable characteristics when lowering the loads.

Second, to eliminate the necessity of a mechanical brake which has in general been a complicated and troublesome device.

Third, to bring about all speed changes with substantially perfect smoothness, either when hoisting or lowering, instead of by the step by step method that has heretofore characterized hoisting systems of the class in which no mechanical brake is used, so that the safe and proper placing of the loads can be accomplished with less skill than is necessary with the step by step method of speed variation and with a greater degree of accuracy and less liability of damage to the load and hoist.

To accomplish the object of my invention I provide a controller, which when operated to hoist the load connect the motor with its armature and field in series, the speed of hoisting being regulated by a variable resistance in series with the motor, in substantially the same manner as disclosed in my former Patent #723,817, dated March 31, 1903. In lowering the load I connect the field and armature in separate circuits. The field circuit contains a variable resistance element comprising a fixed resistance which is paralleled by a variable resistance of the compression or carbon pile form, the conductivity of which may be varied by pressure. The armature circuit generally contains a fixed resistance of low ohmic value. These two circuits are connected in parallel and the parallel circuits collectively connected to the supply mains in series across the line, with a variable protecting resistance element, comprising a fixed resistance shunted by a compression resistance, the conductivity of which is also varied by pressure.

To drive the hook downward the operating lever is moved to the first point of the controller on the lowering side. At this point the resistance in the field circuit bears such a ratio to the resistance of the armature circuit that the proportion of the total current flowing into the motor, that is diverted through the field, is sufficient to produce a field of safe value and of sufficient intensity to bring about the minimum lowering speed. At this first point of lowering the variable protecting resistance in series with the two parallel circuits is at a maximum and the variable resistance in the field branch is at a minimum. To secure higher speeds when lowering, the operating lever is moved still farther from the off or central position, with the result that the resistance is simultaneously increased in the field circuit and decreased in the protecting resistance, until at full speed the motor is operating with minimum safe field strength and the protecting resistance substantially reduced to zero, so that the armature is connected directly across the supply mains.

The electrical actions which take place in the motor depend upon the load. In the case of a light load which is not of itself sufficient to overcome the friction of the hoisting mechanism, the motor acts as a shunt motor or a motor with a separately excited field, the speed at any instant being determined by the current that is permitted to flow in the field windings. Loads that are not sufficiently heavy to overcome the static friction and inertia of the hoist mechanism, but are sufficiently heavy to drive the hoist in a downward direction when once started, are given their initial acceleration by the motor. Loads that are sufficiently heavy to overcome all resistance of the mechanism and drive the hoist in a downward direction without an initial "kick off" are also started downward by the motor for the purpose of giving an acceleration higher than that which would result from gravity alone.

When lowering a load that has weight enough to overhaul the motor there will be a point in the progress of the acceleration where the armature will be rotating at a speed just sufficient so that its normal counter-electromotive force will just balance the impressed electro-motive force in the paralleled field circuit. Under these conditions the motor is performing no function, merely operating as an idler. As the velocity of the falling load increases with a resulting increase in the rotating speed of the armature, the counter electro-motive force will rise above the impressed voltage in the parallel field branch, and the armature will begin to deliver current to the field. At this stage the motor will have become a generator and will tend to stop any further acceleration of the falling load. The energy over and above that absorbed in the mechanical friction of the hoist mechanism will be returned in the form of electric energy to the motor field and under some conditions a limited amount of electric power will be returned to the supply mains.

A steady speed is reached as soon as the torque set up by the motor acting as a generator balances the driving power of the load thus producing equilibrium.

Having described my invention in general terms, I will now describe it more in detail, reference being had to the accompanying drawings forming a part hereof.

In the accompanying drawings like characters designate the same parts in the several figures.

Fig. 5 is a rear view, parts being broken away to show the operating mechanism more clearly.

Fig. 6 is a drawing of the circuit connections of the controller.

Figs. 7, 8, 9, 10, 11 and 12 indicate diagrammatically the circuit connections of the controller at different stages of its operation.

Figure 1:
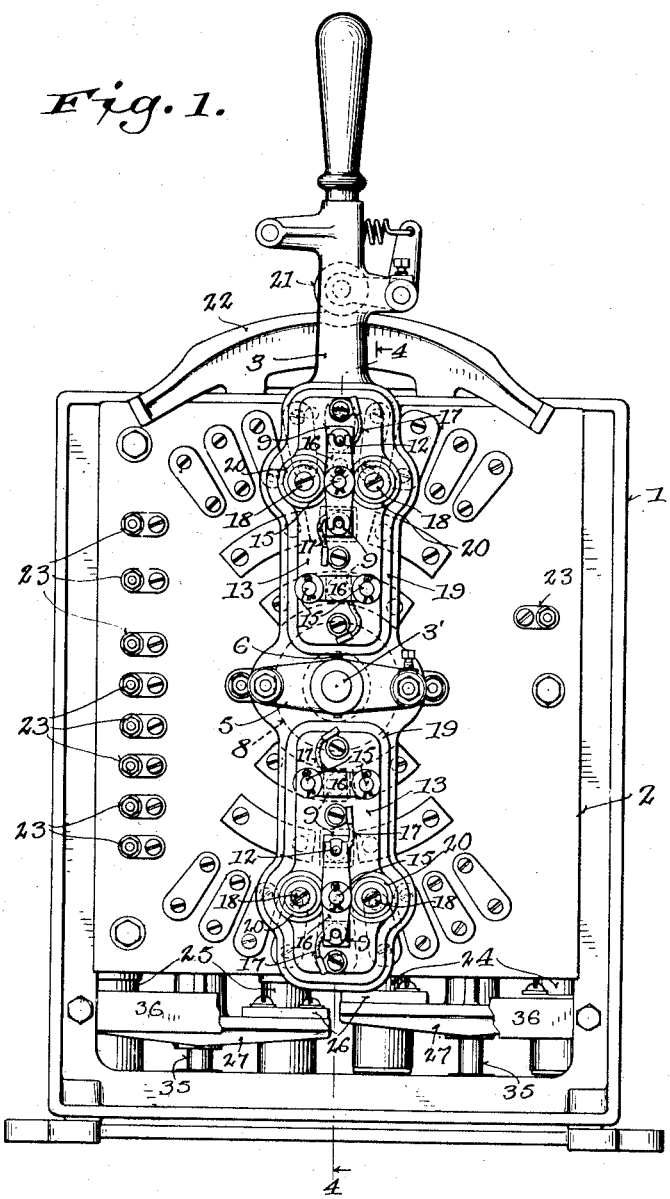
Figure 1 is a front elevation of a controller, the carrier guide being shown broken away at 36.
Figure 2:
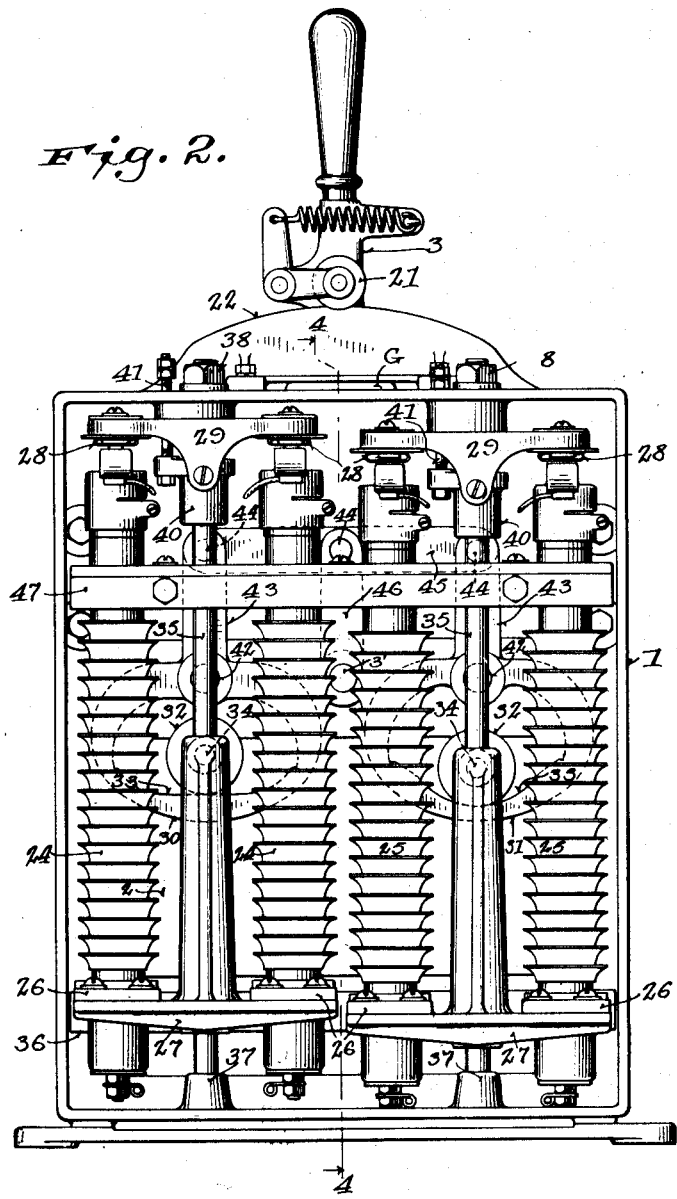
Fig. 2 is a rear elevation showing the general construction.
Figure 3:
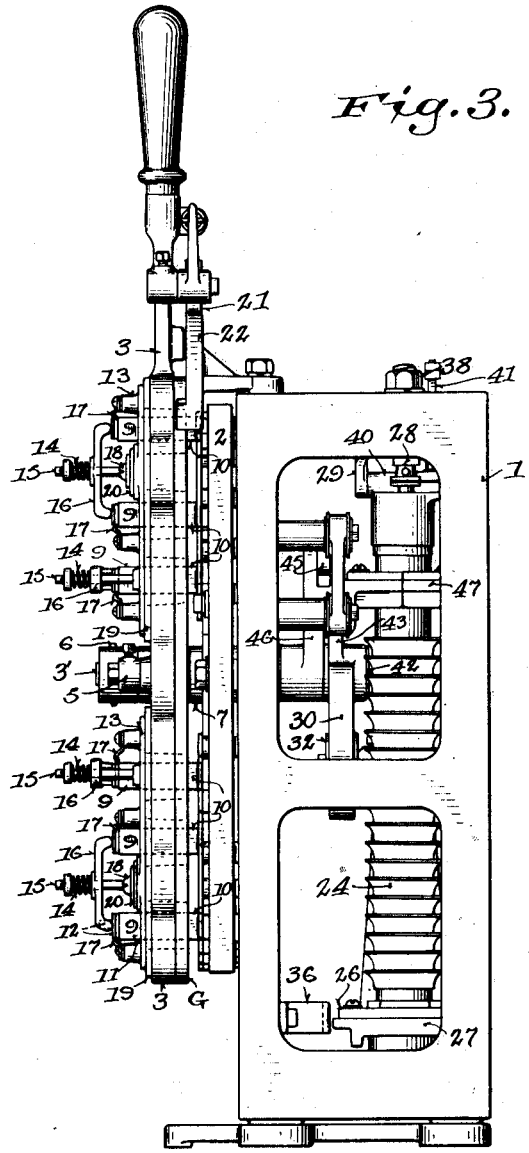
Fig. 3 is an end view of the device.
Figure 4:
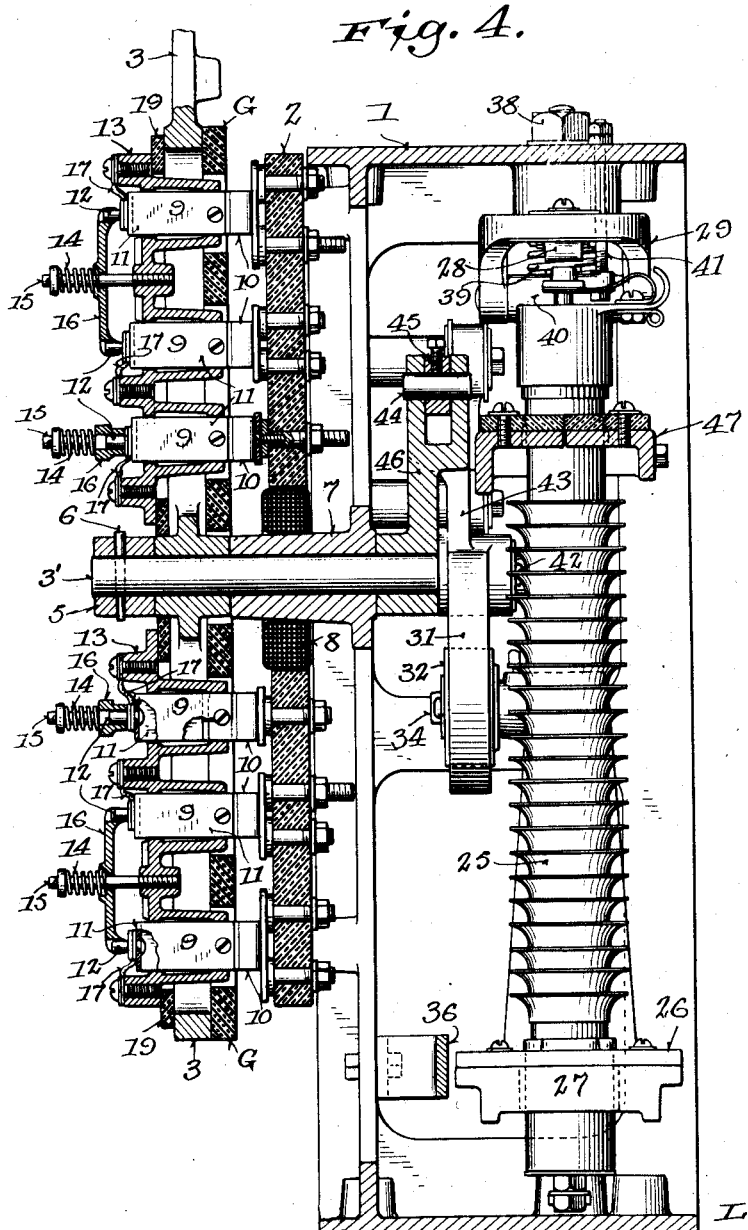
Fig. 4 is a vertical section through a plane indicated by the line 4—4, Fig. 2.

The frame 1 as indicated in Fig. 1 supports the insulating panel 2 upon which are mounted the fixed contact parts of an electric switch, before which moves the operating lever 3, carrying the moving parts of the switch. The lever 3 is pivotally held by the shaft 3' to which it is rigidly attached by the cross arm 5. The cross arm 5 is indicated as being attached to the shaft 3' by means of the taper pin 6. A central boss 7 is shown as cast integrally with the frame 1, its purpose being to carry the shaft 3' and also act as a core for the arc extinguishing magnet 8. The moving parts of the switch comprise the brushes 9 that are made up of a renewable tip 10, a clamping frame 11, the shouldered dowels 12, together with their holders 13, and attachments that in turn consist of springs 14 for maintaining the brushes in resilient contact with the fixed parts of the switch, studs 15 for supporting the springs 14 and yokes 16 bearing on the brushes against which the spring acts. Good electrical contact is assured between the brushes in each group by means of the flexible cables 17 leading from the brushes to the holders 13. The brush holders are attached to, but insulated from, the lever 3 by means of the screws 18 and the insulating members 19 and 20. The side of the lever 3 facing the fixed parts of the switch is provided with an insulating arc deflecting shield G. The operating lever 3 is provided with the roller 21, traversing the runway 22 for the purpose of making the manual effort, required to move the controlling lever, more uniform, as described in my former patent dated May 29, 1906, #821,697. Upon the panel 2 are also mounted the terminals 23. The resistance units 24 and 25 are shown broken away in Fig. 5 and are of the well known form as disclosed in my former Patent #1,054,902, dated March 4, 1913, and are of the compression resistance type, the resistor plates being indicated at J in Fig. 5. These units are mounted by means of insulating sockets 26 upon supporting carriers 27 and are lifted with increasing pressure against the spring cushioning abutments indicated at 28, which are insulated from, but attached to the rocker or abutment supporting members 29, when the carrier moves upwardly, the columns being compressed between the carriers and the abutments. The mechanism operating the carriers is so arranged through the agency of the cams 30 and 31 that the carriers 27 will move in opposite directions. Thus when one carrier has moved upwardly through its maximum travel and has therefore subjected the resistance medium, mounted upon it, to maximum compression, the other carrier will have moved downwardly to the limit of its travel, thereby reducing to a minimum the pressure upon the resistance mediums which it supports. The upward and downward movement of the carriers is effected by the relative movement of the rollers 32 upon the cam margins 33. The rollers 32 are pivotally attached to the carriers 27 at the points 34. This cam mechanism is more fully disclosed in my former Patent #1,071,138 dated August 26, 1913. The carriers are guided by the rods 35 and prevented from twisting thereon by the bar 36. The rods 35 are attached to the frame 1 at 37 by means of a screw thread. The upper parts of these rods are provided with the nuts 38 so arranged as to maintain the rods in proper position and are also adapted to adjust the tension with which the spring 39 bears against the sleeves 40. The abutment supporting members 29 are pivoted to the sleeves 40 which are slidably mounted on the rods 35 and are maintained in position by the adjusting studs 41 and spring 39. The carrier operating cams 30 and 31 are pivotally supported at the points 42 and operatively connected by the arms 43 and the pins 44 to the link 45, which is enabled to rotate the cams in unison by virtue of the motion imparted to it by the crank 46 moved by the operating lever 3 through the agency of the main shaft 3'. The resistance units 24 and 25 are guided at their upper extremity by the insulated support 47 which is constructed in such a manner that it can be readily taken apart to allow for the easy removal of the resistance units.

Referring to the connection diagrams, Fig. 6 is a working drawing showing the method of connecting the controller, for the purpose of controlling a motor when used with an electric hoist. Figs. 7, 8, 9, 10, 11 and 12 are further simplified diagrams showing the connections at different stages of the controller operation. My improved controller herein shown and described operates as follows:

In the hoisting direction the motor is controlled by plain rheostatic control. The operating lever is assumed to be moved to the position indicated by the line A shown on Fig. 6. It is understood that as soon as the switch H closes, establishing the motor circuit, the current passing through the winding of the brake magnet 48 releases the brake, allowing the operation of the motor and mechanism driven by it. The simplified diagram Fig. 7 indicates the path of the current. It will be noted that in this position, the clapper switch H is closed and its operating coil 49 connected across the supply main, through the carbon pile resistance 25. The motor armature 50, field 51 brake winding 48 and carbon pile resistance 25 are connected in series across the supply mains through the contacts of the clapper switch H and the blowout magnet 52. The motor will then drive the hoist as a simple series motor at its slowest speed, the resistance being at its maximum and is therefore under minimum pressure, the carrier 27 supporting the resistance units 25 not having been moved upwardly a sufficient distance to press the resistance unit 25 with much force against the abutments 28.

In the working diagram Fig. 6 the wiring is indicated as used in connection with the well known Allen-Bradley compression type of hoisting controller. 50 is the armature of the motor to be controlled. 51 is the series field winding of the motor and 48 is the magnetic brake of the usual construction. The brake is applied by means of a spring or weight and released by the current flowing through the winding. 53 is the controller by means of which the motor may be started, stopped, reversed and regulated. L and H are the magnetic switches that connect the motor and controller to the source of supply. To hoist the load, the operating lever 3 is moved to the first point in the hoisting direction, corresponding to the line A. Fig. 6. The path of the current will first be through the operating coil of the clapper switch H and is from the plus side of the line through the blowout magnet 52 to the point 54, through the resistance units 25 to the plate 55; then through the conductor to the plate 62, from there through the brushes to the plate 64; thence to the terminal 65, through the operating coil 49 of the hoisting clapper H and then to the minus side of the line. Upon the closure of the hoisting clapper H, the motor circuits are energized and these circuits are as follows: From the plus terminal 66 through the blowout coil 52, through the resistance units 25 to the plate 62; then across the brushes to the plates 67 from there to the terminal 68; then through the windings of the brake 48, field 51 and armature 50 to the contacts of the clapper switch H; thence to the minus line. To increase the speed of the motor in a hoisting direction, the lever is moved farther away from the center or off position, allowing the circuits to remain the same, but, by the movement of the carrier 27, steadily increasing the pressure on the resistance units 25, and consequently steadily decreasing their resistance, until the position of greatest speed is reached, corresponding to the line B Fig. 6 at which point the resistance units 25 have been compressed to a maximum by the carrier 27 and are shunted from the circuit. The path of the current in the motor circuit when the lever is in this position is from the plus terminal 66, blowout magnet 52, segment 69, across the brushes to the plate 71; then to the plate 62, across the brushes to the plates 67; then to the terminal 68, to the motor and clapper switch to the plus side of the line. Fig. 8 is a simplified diagram indicating the circuits as described, the resistance 25 being indicated as shunted at the point 73. In arriving at this point, the compression on the resistance units 25 has been gradually brought to maximum and its resistance to minimum, by the raising of the carrier 27, until the resistance columns 25 have been compressed to the utmost. After this condition of pressure is reached, the resistance unit is shunted from the circuit.

The motor then receives substantially full line potential through the clapper switch contacts and the brake solenoid. When it is desired to stop the motor, the operating lever is moved to the off or central position which corresponds to the line C Fig. 6. This movement causes the shunt around the resistance units 25 to be first removed; then the carrier 27 to release the pressure on the resistance units, thereby inserting resistance into the motor circuit, allowing the motor to slow down and finally rupturing this circuit. This allows the brake coil 48 to be deenergized permitting the brake to set and bring the motor and hoisting gear to rest.

Fig. 9 is an elementary diagram indicating the circuits when the lever is at the described off or central position as indicated by line C Fig. 6. The motor armature 50, field 51 and a low resistance 74 are shown as being connected in a series. This forms a circuit of low resistance and is the position at which the braking action of the motor is most effective, and should the magnetic brake fail through accident, the load would descend very slowly. Tracing the above described circuit connections in Fig. 6, the operating lever is assumed to be in a position corresponding to the line C which is the off or central position. The path is starting from the motor brush 75 to the field 51 to the controller terminal 76; then to the plate 77 through the brushes to the plate 62; then through the conductor to the plate 78 across the brushes to the plate 80 and from there to the controller terminal 91; through the resistance 74 to the motor brush 92 thus completing the circuit. To start the load downward, the operating lever is moved to the first position in the lowering direction corresponding to line D, Fig. 6. The switch L is at once closed, its operating coil being energized from the supply lines through the resistance units 25, which are now paralleled by the fixed resistance 57 as is clearly indicated in Fig. 10. This establishes the following motor connections: the armature 50 and fixed resistance 74 are connected in parallel with the field 51 and brake magnet 48. The variable resistance 24 is shunted from the circuit. These parallel circuits are connected to the line through the variable compression resistance units 25, that are shunted by the fixed resistance 57 all being in series with the blowout coil 52. The total resistance of the combination is adjusted so that the current flow will be sufficient to drive the motor in a downward direction and is usually about equal to the full load rating of the motor, the carrier 27 supporting the resistance units 25, being in such a position that the units are substantially free from pressure. The resistance of the parallel circuits containing the field and armature are so adjusted by means of the fixed resistance 74 that about two-thirds of the current flows through the field and about one-third through the armature. This constitutes the circuit conditions that bring about the slowest lowering speed whether the motor is driven downward by power from the line or is overhauled by the load, the motor retaining the characteristics of either a shunt motor or generator depending whether it is driving the hoisting gear or is being driven by the load. Referring to Fig. 6 the operating lever is assumed to have been moved to the first lowering position corresponding to the line D. The path of the current will first be through the circuit of the operating coil 98 of the clapper switch L. Starting at the plus terminal of the controller the current will pass through the blowout coil 52; then through the conductor to the resistance units 25, through the conductor to the plate 62, across the brushes to the plate 96; then to the terminal 97, from there through the line wire to operating coil 98 of the clapper switch L, and from there to the minus side of the line. This closes the lowering clapper switch L and its operating circuit remains substantially unchanged regardless of the changes in the motor circuit while lowering. The closing of the clapper switch energizes the motor circuits which can be traced as follows: starting at the plus terminal 66 on the controller through the blowout coil 52; thence through the conductor to the point 54. Here the current divides as the compression resistance 25 is paralleled by the fixed resistance 57. The division of the current that passes through the fixed resistance 57, passes from the point 54 to the terminal 56, then through the resistance 57 to the terminal 58, then to the plates 59 and across the brush to the plate 80. The part of the current that passes through the variable compression resistance passes simply from the point 54, through the resistance units 25 arriving at plate 55 and joins the other division of the current at the plate 80, through the brushes. The current then, that is not diverted for the field section, passes to the armature through the conductor to the terminal 91, then through the resistance 74 to the motor armature 50, then to the minus line through the clapper switch L. The current that energizes the field section of the motor circuit at this position of the operating lever can be said to leave the point at plate 55, traverse the conductor to the plate 62, thence across the brushes to the plate 100, then to the terminal 68 and from there out over the line to the winding of the magnetic brake coil 48, then through the motor field 51 to the clapper switch L and to the minus line. The next increase in speed is when the operating lever is moved farther in the downward direction corresponding to line E Fig. 6. The connections are the same as previously described in Fig. 10 except that the shunt 101 has been removed from the resistance units 24. This slightly increases the resistance and decreases the flow of current in the field branch of the motor circuit with a consequent slight increase in speed. As the operating lever 3 is moved toward a position corresponding to the line F, Fig. 6, the carriers 27 will gradually diminish the pressure on the resistance units 24, paralleling the fixed resistance 93 in the field branch, thereby increasing the sum of the resistance of the group and gradually increase the pressure on the resistance units 25 in the line circuit, paralleling the fixed resistance 57, so that the sum of the resistance of this group is reduced. These changes of resistance in the field and armature circuits result in a gradual reduction of the field current and a gradual increase in potential across the armature with a consequent increase in speed. This circuit can be traced in Fig. 6. The operating lever is assumed to have been moved to the second lowering position or a position corresponding to line E. The lowering clapper switch remains closed as previously described. The motor circuit can be traced from the plus terminal 66 to the blowout coil 52, then through the conductor to the point 54 where the current divides; part going to the terminal of the fixed resistance 57, then to terminal 58 and plates 59; then across the brushes to the point at plate 55, the remainder of the current leaving point 54, passes through the compression resistance units 25 and arrives through the conductor to the point at 55. Here the current again divides; that passing through the armature branch has a path through the brush to the plate 80, then through the conductor to the terminal 91, through the resistance 74 to the armature and to the minus line, through the contacts of the clapper L. The current that is to energize the field leaves the point at 55 and divides a part traversing the conductor to the plate 62 and through the brushes to the plates 100; thence through the conductor to the resistance units 24, then through the conductor to the plates 67 and from there to the terminal 68 and to one terminal 102 of the fixed resistance 93. The part of the field current that does not pass through the compression resistances 24 leaves the point at 55, traverses the conductor to the terminal 102, then passes through the fixed resistance 93 and unites at the point 103. The entire field current then passes through the conductor to the winding of the magnetic brake 48 and field 51 and then to the minus line through the wire and the lowering clapper L. When the end of the travel of the operating lever is reached, which is the maximum speed position, in the downward direction, corresponding to line F, Fig. 6, the circuits are as indicated in the simplified diagram Fig. 12. It will be clearly seen that the resistance groups 25 are shunted from the circuit so that the armature 50 and low resistance 74 are directly across the supply mains, the armature receiving substantially the full line potential. The variable compressible resistance 24 is disconnected from the circuit and therefore ceases to parallel the fixed resistance 93. This reduces the field current to the pre-determined minimum, the field and brake receiving its current through the resistance 93; the result of these changes being to increase the speed of the motor to the limit of safety when it is acting either as a motor or a generator. This combination of circuits can be traced in the working diagram Fig. 6, as follows: the circuits of the lowering clapper switch are unchanged over the previous positions of the lever when moved in the lowering direction. The motor circuits can be traced from the plus terminal 66 of the controller to the blowout magnet 52, then through the conductor to the plate 54. Here the current divides, part going over the brushes to the plate 80, thence to the terminal 91 and through the fixed resistance 74 to the motor armature, from there it passes through the lowering clapper switch contacts to the minus line. The part energizing the field traverses the brushes from the plate 54, passing into the plate 55 and is led to the terminal 102; then to the fixed resistance 93 to the magnetic brake winding 48, then through the field 51 to the clapper switch L, then to the minus line.

The amount of electrical energy and consequent heat dissipated by a dynamic lowering controller is far greater than that which the ordinary form of series reversible controller, as disclosed in my former patent, dated May 29, 1906, #821,697, is called upon to dispose of, as the dynamic lowering controller must absorb most of the energy of the descending load and for this reason the fixed resistances 57 and 93 are connected as described as auxiliaries to the normal radiation in the form of the compression resistances. The fixed resistances 57 and 93 can be installed at a point remote to the controller, thus allowing a large portion of the heat to be dissipated away from the operator, and also permitting the controller to be constructed of considerably less dimension and of a size suitable for use in an ordinary crane cab. If sufficient radiation in the form of compression resistance was built into the controller, together with the necessary compression mechanism for its operation, so that the controller could be used without the auxiliary fixed resistances, the controller would be so massive as not to be adaptable to the ordinary crane equipment, and further the heat dissipated would make its operation impractical. These auxiliary resistances under certain circumstances dissipate more than 75% of the total energy absorbed by the controller, particularly in cases where the hoist mechanism is driven at maximum speed in both directions and the distance through which the load is hoisted and lowered is comparatively great. For it will be observed in the simplified diagram Fig. 12 that the full speed lowering connections are such that the compression resistance 25 is shunted from the circuit and the compression resistance 24 is disconnected, the motor field 51 receiving its current only from the fixed resistance 93.

I have used herein and in the claims several words and phrases which I now desire to define. The words "compressible resistance medium" mean a resistance whose electrical conductivity is varied by pressure. "Decompressing" means gradually releasing the pressure from the compressible resistance medium. When I use the words "absorbing energy" I appreciate that under the theory of conservation of energy, energy may not technically and strictly be absorbed, but I mean thereby transmutation of mechanical energy into either electrical energy or heat or both, in some cases the energy being returned to the line and in other cases being transmuted into and dissipated as heat or entropy. I have also used the word "simultaneously" and I do not mean to be understood as limited to strictly mathematical simultaneity, although that is desirable; for some purposes it is sufficient if the changes occur approximately at the same time or separated by relatively short intervals of time. A compressible resistance medium may be removed from the circuit either by shunting or disconnecting and I have this two-fold method in mind when I use the phrase "remove from the circuit" or its equivalent. I have used the words "differential" and "differentially" as indicating compression and simultaneous and opposite decompression of separate sets of compressible resistance media, as I know of no better word to convey this idea.

Having thus described my invention, what I claim as new and desire to secure by United States Letters Patent is:

1. In a control system for an electric motor for delivering and absorbing energy the combination of a source of current supply, a field and an armature connected in parallel circuits, two sets of compressible resistance media, and a means for independently compressing and simultaneously decompressing said sets of resistance media; one set of said media connected in series with the field circuit and one set connected in series with the parallel circuits.

2. In a control system for an electric motor for delivering and absorbing energy, the combination of a source of current supply, a field and an armature connected in parallel circuits, two sets of compressible resistance media, a means for independently compressing and simultaneously decompressing said sets of resistance media; one set of said media connected in series with the field circuit and one set connected in series with the parallel circuit, and means for independently removing from the circuits at predetermined points the sets of compressible resistance media.

3. The method of controlling an electric motor for delivering and absorbing energy which consists in connecting the armature and series field windings of the motor in series with a compression resistance and compressing said resistance to increase the speed of the motor for one direction of rotation; then connecting the series field in series with a compressible resistance and connecting a fixed resistance in shunt with the compressible resistance; connecting the armature in parallel with the field and said resistances and connecting said parallel circuits in series with another compression resistance; then increasing the pressure on the resistance in series with the parallel circuits and simultaneously decreasing the pressure on the resistance in series with field circuit and then removing the shunt around said resistance in the field circuit to increase the speed of the motor in the opposite direction.

4. In a current controlling device, the combination of a plurality of sets of compressible resistance media, a plurality of pressure applying cam members, rollers adapted for relative travel along the cam faces and connected to the compressible resistance media, and a lever for effecting said relative travel, said cam faces being of such relative curvature as to simultaneously compress and decompress the resistance sets.

5. A method of controlling an electric motor for receiving and absorbing energy, which consists in commutating the circuits so that the motor runs as a series motor, compressing a compressible resistance medium in the line circuit and finally removing said resistance medium from the line circuit, commutating the circuits so that the armature and field are in series and constitute a circuit of low ohmic value, introducing a compressible resistance medium into the field circuit and commutating the circuits so that the armature and field circuits are connected in parallel and also connected across the line in series with a compressible resistance medium, simultaneously compressing the compressible resistance medium in the line circuit and decompressing the compressible resistance medium in the field circuit, and then removing both compressible resistance media from the circuits while continuing the line and field circuits.

LYNDE BRADLEY.

Witnesses:
WM. J. AMES,
T. J. HAWLEY.